United States Patent [19]

Wingfield, deceased et al.

[11] 3,875,381

[45] Apr. 1, 1975

[54] STRESS WAVE EMISSION DEFECT LOCATION SYSTEM

[75] Inventors: Peter Maurice Wingfield, deceased, late of Winterbourn Kingston, England Joanna Wingfield, executrix; Roger Hill Warren, Poole, England

[73] Assignee: National Research Development Corporation, London, England

[22] Filed: May 15, 1972

[21] Appl. No.: 253,614

[30] Foreign Application Priority Data
May 13, 1971 United Kingdom............. 14839/71

[52] U.S. Cl.............................. 235/151.3, 73/67.9
[51] Int. Cl..................... G01n 29/04, G06f 15/20
[58] Field of Search.......... 235/151.3; 324/52, 71 R, 324/71 NE; 340/15, 16 R, 16 L, 16 P, 15.5 AC, 15.5 AP; 181/.5 AC, .5 NP; 73/67.5 R, 67.7, 67.8 S, 67.9

[56] References Cited
UNITED STATES PATENTS
| | | |
|---|---|---|
| 3,285,059 | 11/1966 | Bogle.................................... 73/67.9 |
| 3,340,955 | 9/1967 | Gollwitzer............. 340/15.5 AP UX |
| 3,362,011 | 1/1968 | Zemanek, Jr.......... 340/15.5 AC UX |
| 3,375,706 | 4/1968 | Pandelis et al....................... 73/67.9 |
| 3,482,435 | 12/1969 | Gunkel.................................. 73/67.9 |
| 3,524,162 | 8/1970 | Zill....................... 340/15.5 AC UX |
| 3,555,889 | 1/1971 | Weighart.............................. 73/67.9 |

Primary Examiner—Malcolm A. Morrison
Assistant Examiner—Jerry Smith
Attorney, Agent, or Firm—Cushman, Darby & Cushman

[57] ABSTRACT

The invention is a system for determining the location of defects in structures, using a suitable programmed computer, in which a number of transducers are placed at different locations in the structure to pick up the bursts of stress wave emission produced by the defects and to determine the location of the defects from the differences in the times of arrival of the burst at the various transducers, the arrival of each burst being determined by a peak level sensing circuit rather than by leading edge triggering, as used in previous systems.

2 Claims, 2 Drawing Figures

LOG AMPLIFIER TRIGGER DIAGRAM.

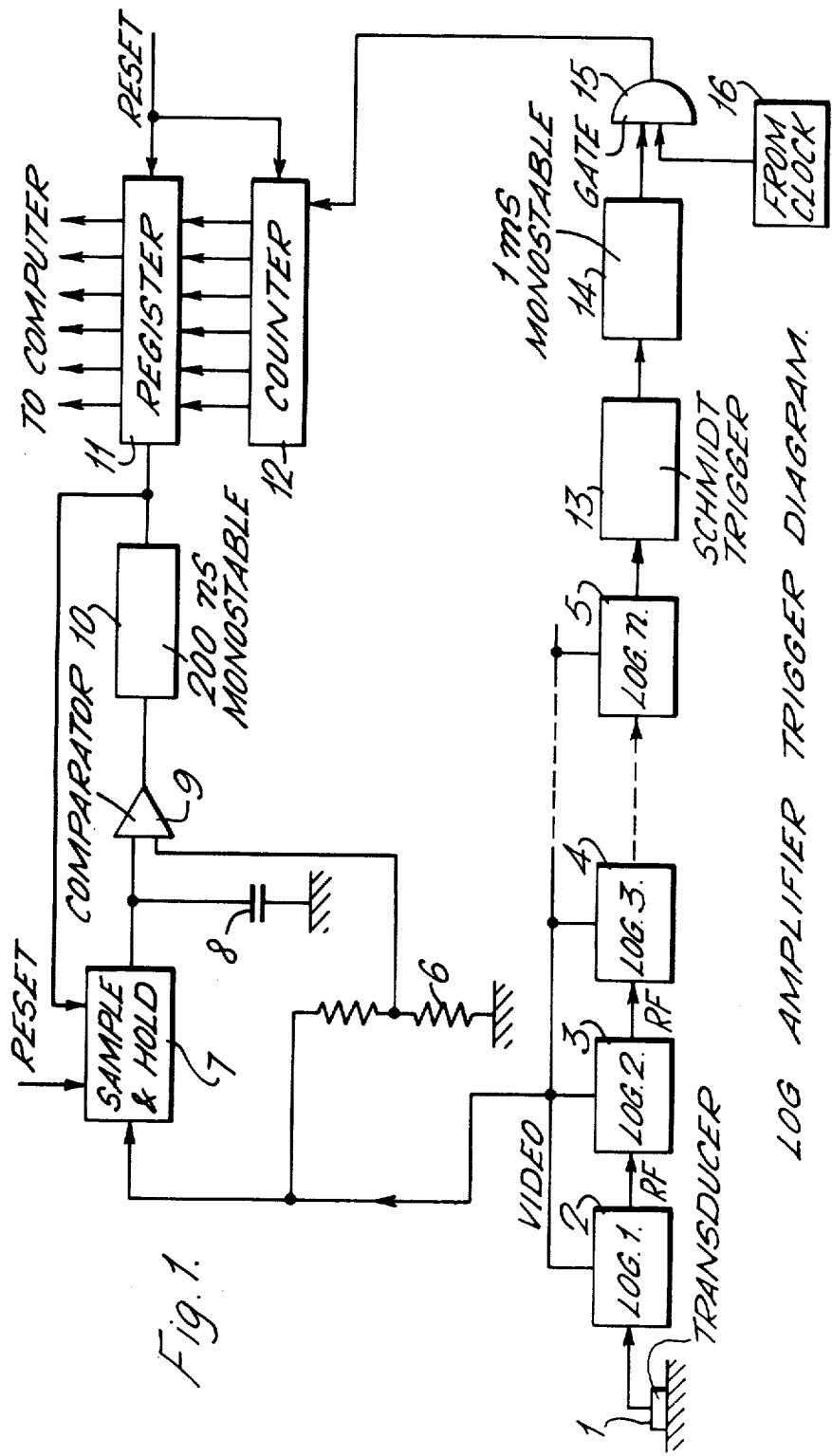
Fig.1. LOG AMPLIFIER TRIGGER DIAGRAM.

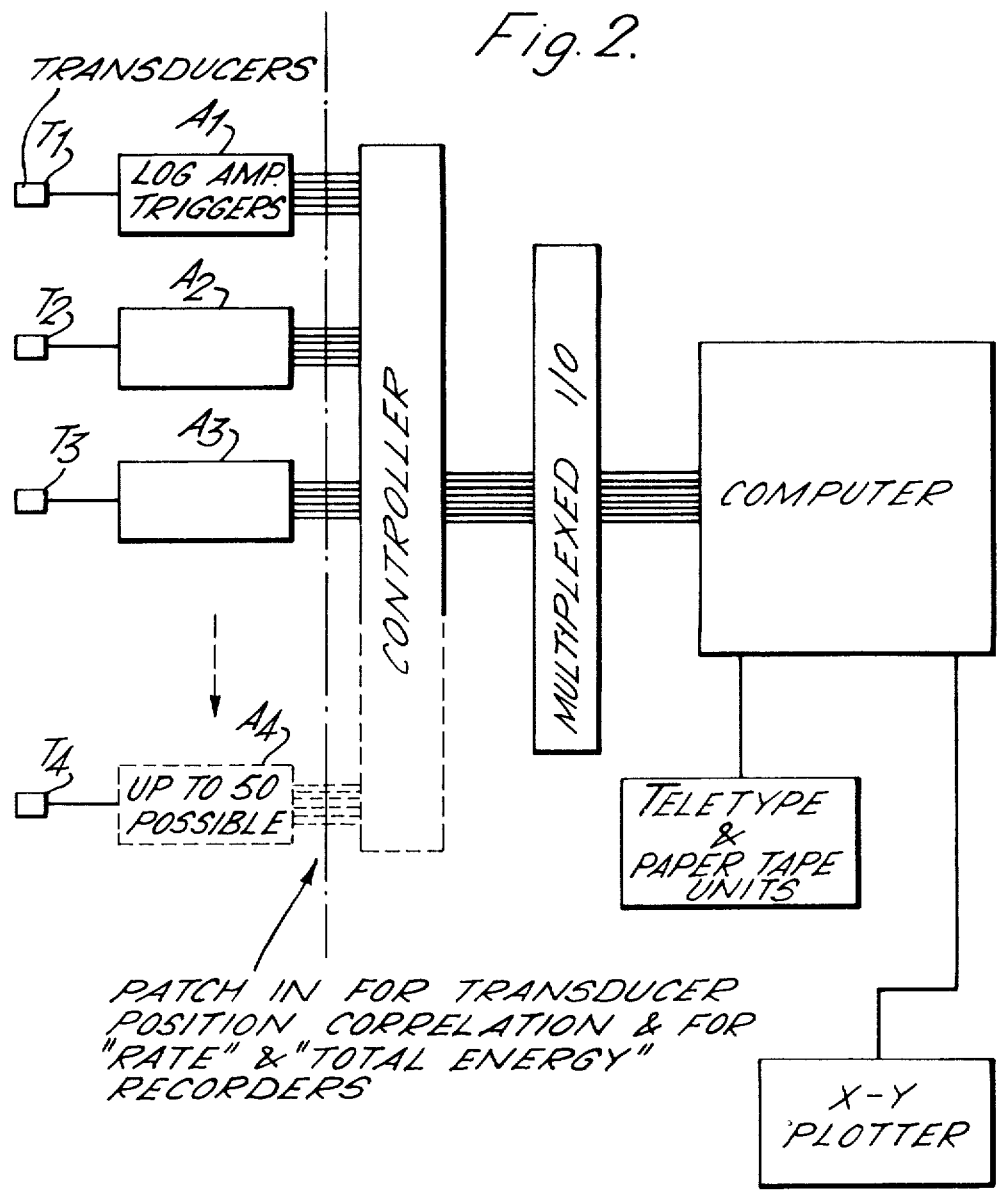

STRESS WAVE EMISSION DEFECT LOCATION SYSTEM

Active defects, such as cracks, in structures undergoing proof test or even under normal operational loads can produce bursts of stress waves characterised by a wide frequency content having a peak energy level which propagates at a constant velocity. These peaks can be detected by suitable sensors and used to locate the position of the defects.

The system described employs specially made sensors comprising transducers, suitably coupled to the structure under test in a number of positions, which are cut to be resonant over a selected frequency band and are matched to, for example, 50 ohm transmission lines by toroidal transformers. A special feature of the present invention is the use of peak level sensing to determine the arrival of each burst of stress waves at each sensor position rather than leading edge triggering, as used in previous systems of stress wave emission defect location. Leading edge triggering is liable to give spurious results and is not so accurate as the present system in determining the location of defects in the structure.

The signals are amplified using specially designed logarithmic amplifiers (to provide a large dynamic range capability) and which are used in connection with a peak detection circuit to locate the signal peak in the time domain. A "sample and hold" circuit when activated by the stress wave emission gates clock pulses to micro-circuit registers on its own channel and other selected channels and the registers then accept clock pulses for a predetermined period. The "sample and hold" circuit repeatedly gates a counter into the register during sampling of the logarithmically amplified signal until the peak is reached.

The differences in the numbers in the register for each channel therefore correspond to the difference in the time of arrival of the emission peak at each sensor.

The logarithmic amplifiers are dual purpose devices which start the signal processing sequence and also produce a summed video output proportional to the logarithm of the input. The video derived signal with its much greater dynamic range is used to sense the emission peak of the signal.

The present invention comprises a stress wave emission defect location system for structures in which the arrival of a burst of stress wave emission at a location in the structure is determined by detecting the arrival of the peak energy level therein at that location by repeatedly comparing the amplitude of cycles of the amplified signal received at that location with the amplitude of succeeding cycles of the amplified signal so as to control the operation of a comparator circuit whose operation is dependent upon the amplitude of the succeeding cycles exceeding that of the preceding cycles.

One embodiment of the present invention will now be described, by way of example, with reference to the accompanying drawings, in which:

FIG. 1 is a block schematic diagram of the circuit for detecting the emission peaks of the signals at each location; and FIG. 2 is a block schematic diagram of the complete system.

Referring to FIG. 1, a piezo-electric crystal transducer 1, which is manufactured so as to be resonant over a selected frequency range, is matched by a toroidally-wound transformer to a transmission line which carries the stress wave emission signals received by the transducer 1 in succession to a series of logarithmic amplifiers 2, 3, 4 and 5, each of which has a nominal gain of 10dB so that 10 such amplifiers produce a total gain of 100dB.

Due to the wide dynamic range of amplitude of stress wave signals it is quite likely that in the later stages of the series of logarithmic amplifiers the amplified signal will exceed the saturation level of the amplifiers, but, nevertheless, the Schmitt trigger 13, to which the output of the series of logarithmic amplifiers is applied, will switch on the moment the amplified signal appears above the noise level and will trigger the monostable 14, which is designed to remain on for a short interval of, say, 1 millisecond. The monostable 14 during its "on" period gates 1 MHz clock pulses from clock 16 via gate 15 into a micro-circuit counter 12 which proceeds to total the clock pulses. In order to detect the peak amplitude of the emission signal each logarithmic amplifier includes an envelope (video) detector, the outputs of which are summed in the video rail and therefore represent the logarithm of the signal amplitude i.e. the sum of the half cycles of the signal amplitudes in the early unsaturated stages of the amplifiers plus the number of saturated half cycles in later stages. This video signal will increase with time, cycle by cycle, until the emission peak is reached. Each cycle is sampled in the "sample and hold" circuit 7 and a sample is held on capacator 8 for comparison in the comparator 9 with a proportion of the next succeeding cycle of the signal, which proportion is derived from the resistance divider circuit 6. The comparator 9 will operate only if the successive cycles of the signal are of greater amplitude than the previous cycles of the signal and will then operate a fast monostable 10, which will then reset the "sample and hold" circuit 7 and momentarily (e.g. 200 nanoseconds) open the register 11 which will then accept and store the contemporary total in the counter 12. This process continues cycle by cycle until the amplitude of the signal reaches its peak whereupon the contents of the counter are no longer passed to the register. By this means the differences in the contents of the registers of the various channels connected to the various transducers represent the difference in arrival time of the emission signal peak at each transducer. Referring to FIG. 2, each of the blocks $A_1$, $A_2$, $A_3$, $A_4$ etc. represents the block diagram shown in FIG. 1 for each of the various channels connected to each of the various transducers $T_1$, $T_2$, $T_3$, $T_4$, etc. The outputs from all of the channels are patched in to a controller from whence they are interfaced with a multiplexed input/output circuit to a 16K store digital computer on an interrupt basis. The computer carries out a comparative routine on the time differences represented by the differences in the contents of the registers for the various channels and stores the information in groups arranged according to transducer identities and the order of arrival time. Times derived from any transducer groups which have similar values within a previously selected error band are continuously averaged and re-located in a dynamic node string store at higher status, depending on the number of similar time differences obtained. The up-graded time data is periodically used for computation of defect locations. The computer programme includes information on the structure i.e. geometry, velocity of emission energy, location of transducers, etc. and has provision for a flexible link to an XY plotter, which builds up a plan picture of defect locations and severity. This information may, alternatively, be presented on paper tape using a Teletype unit.

We claim:
1. A stress wave emission defect location system for structures including transducer means coupled to the structure under test to convert said stress wave emission to electrical signals, logarithmic amplifier means joined to said transducer means to amplify said signals, circuit means coupled to said logarithmic amplifier means whereby the amplified signals initiate the gating of clock pulses from clock means into counter means, said logarithmic amplifier means including envelope (video) detector means, the outputs of said envelope (video) detector means being summed to produce a video signal whose amplitude increases with time until the stress wave emission peak is reached, sample and hold circuit means in which a sample of each cycle of the video signal is held for comparison with a proportion of the next succeeding cycle and comparator means to compare the amplitudes of successive cycles of said video signal whereby the opening of register means to accept and store the contemporary total of clock pulses in said counter means is controlled.

2. A stress wave emission defect location system as claimed in claim 1 including a plurality of register means, each of said register means relating to one transducer means location on said structure.

* * * * *